(12) United States Patent
Vanderzyden

(10) Patent No.: US 8,339,011 B2
(45) Date of Patent: Dec. 25, 2012

(54) ROTOR ASSEMBLY WIRE SUPPORT

(75) Inventor: Henry R. Vanderzyden, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 432 days.

(21) Appl. No.: 12/632,089

(22) Filed: Dec. 7, 2009

(65) Prior Publication Data
US 2011/0133579 A1  Jun. 9, 2011

(51) Int. Cl.
*H02K 15/08* (2006.01)
(52) U.S. Cl. ........... 310/270; 310/194; 310/216.055; 310/43; 29/598
(58) Field of Classification Search .......... 310/270, 310/194, 216.055, 43; 29/598
See application file for complete search history.

(56) References Cited

U.S. PATENT DOCUMENTS

| | | | | |
|---|---|---|---|---|
| 729,655 | A * | 6/1903 | Parsons | 310/216.104 |
| 2,655,613 | A * | 10/1953 | Wieseman | 310/194 |
| 4,028,573 | A * | 6/1977 | Terrone | 310/216.115 |
| 4,063,123 | A * | 12/1977 | Herr et al. | 310/270 |
| 4,442,369 | A * | 4/1984 | Okamoto et al. | 310/214 |
| 4,490,638 | A * | 12/1984 | Lind | 310/269 |
| 4,554,475 | A * | 11/1985 | Sisk | 310/208 |
| 4,562,641 | A * | 1/1986 | Mosher et al. | 29/598 |
| 4,583,696 | A * | 4/1986 | Mosher | 310/208 |
| 4,614,888 | A * | 9/1986 | Mosher et al. | 310/216.122 |
| 4,683,388 | A * | 7/1987 | De Cesare | 310/46 |
| 4,788,465 | A * | 11/1988 | Hertrich | 310/269 |
| 4,967,465 | A * | 11/1990 | Frank | 29/598 |
| 5,144,182 | A * | 9/1992 | Lemmer et al. | 310/216.116 |
| 5,189,325 | A * | 2/1993 | Jarczynski | 310/54 |
| 5,455,470 | A | 10/1995 | Denk et al. | |
| 5,604,388 | A | 2/1997 | Baker et al. | |
| 5,650,683 | A * | 7/1997 | Shiga et al. | 310/201 |
| 5,666,016 | A * | 9/1997 | Cooper | 310/270 |
| 6,038,761 | A | 3/2000 | Meiler et al. | |
| 6,113,024 | A * | 9/2000 | Pittard et al. | 242/433 |
| 6,137,205 | A * | 10/2000 | Hung et al. | 310/216.115 |
| 6,225,723 | B1 * | 5/2001 | Cooper et al. | 310/214 |
| 6,333,579 | B1 * | 12/2001 | Hirano et al. | 310/194 |
| 6,465,928 | B1 | 10/2002 | Shervington et al. | |
| 6,707,205 | B2 | 3/2004 | Johnsen | |
| 6,727,634 | B2 * | 4/2004 | Tornquist et al. | 310/270 |
| 6,759,771 | B2 * | 7/2004 | Doherty et al. | 310/58 |
| 6,794,792 | B2 * | 9/2004 | Wang | 310/270 |
| 6,844,655 | B2 * | 1/2005 | Kaminski et al. | 310/262 |
| 6,849,987 | B2 * | 2/2005 | Tornquist et al. | 310/270 |
| 6,982,506 | B1 | 1/2006 | Johnsen | |
| 7,015,616 | B2 * | 3/2006 | Doherty et al. | 310/194 |
| 7,157,828 | B2 * | 1/2007 | Moroto et al. | 310/261.1 |
| 7,208,854 | B1 | 4/2007 | Saban et al. | |
| 7,221,073 | B2 | 5/2007 | Yamada et al. | |
| 7,586,224 | B2 | 9/2009 | Osborn et al. | |
| 7,605,505 | B2 * | 10/2009 | Minke et al. | 310/71 |

(Continued)

*Primary Examiner* — Quyen Leung
*Assistant Examiner* — Alex W Mok
(74) *Attorney, Agent, or Firm* — Carlson, Gaskey & Olds, P.C.

(57) ABSTRACT

A rotor assembly for an electromechanical device includes a molded wire support. The wire support has a body including a first side spaced from a second side and a hole extending through the sides and configured to receive a shaft. The body includes a wall about the hole extending to the first side. At least one end turn support extends outwardly from the wall and is configured to support wires. A molded pocket extends into the wall from the second side without penetrating through to the first side.

19 Claims, 4 Drawing Sheets

U.S. PATENT DOCUMENTS

| | | | |
|---|---|---|---|
| 2004/0155550 A1* | 8/2004 | Yamamoto et al. | 310/194 |
| 2006/0022551 A1* | 2/2006 | Ku et al. | 310/254 |
| 2008/0272671 A1* | 11/2008 | Waddell et al. | 310/261 |
| 2009/0066171 A1* | 3/2009 | Kanno et al. | 310/44 |
| 2009/0083966 A1* | 4/2009 | McCabe et al. | 29/598 |
| 2009/0115281 A1* | 5/2009 | Kimura et al. | 310/217 |

* cited by examiner

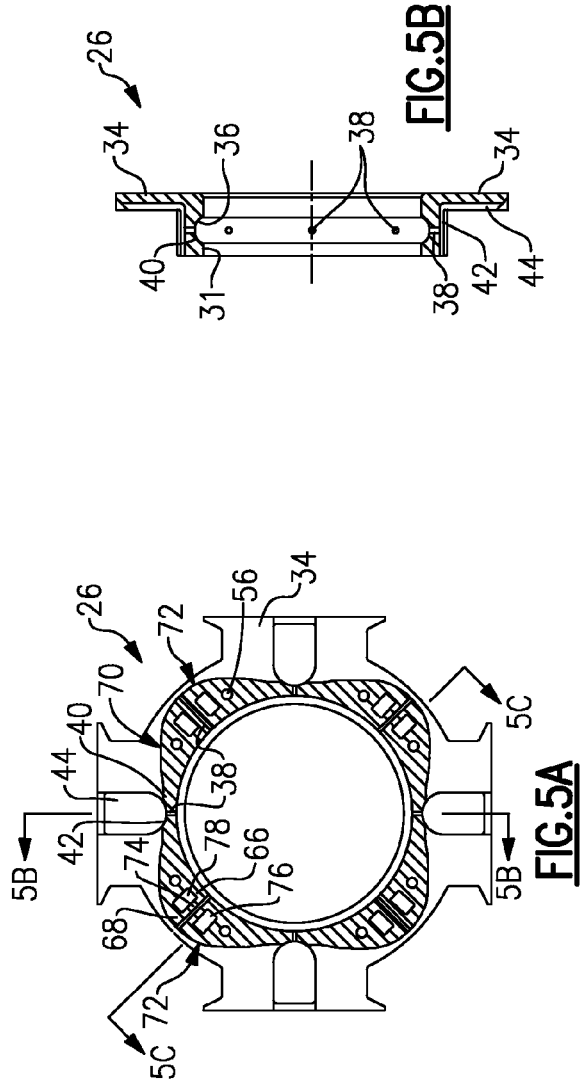

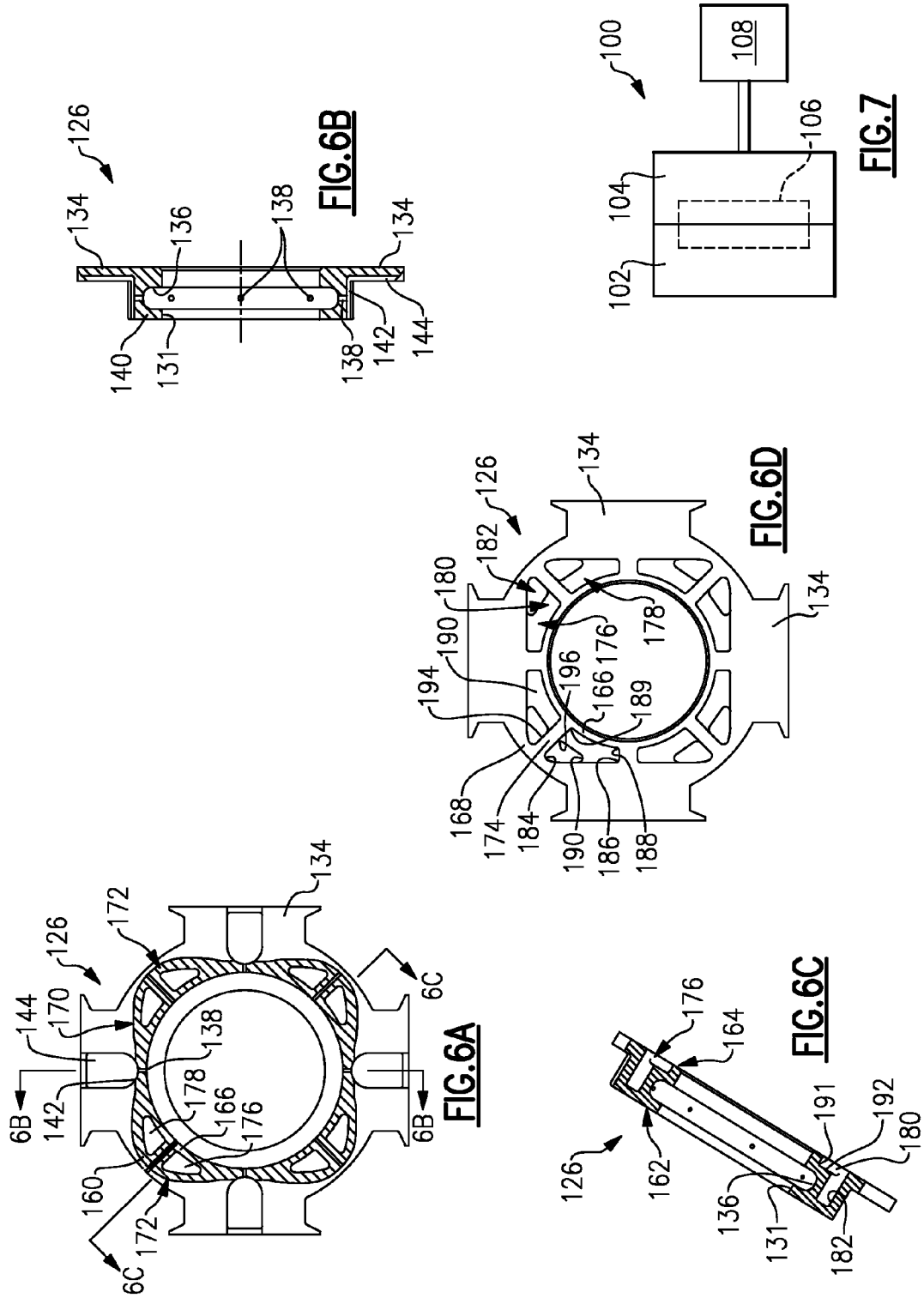

ROTOR ASSEMBLY WIRE SUPPORT

BACKGROUND

This disclosure relates to a rotor assembly wire support and a method for manufacturing the wire support.

Some rotary electromechanical devices, such as an aircraft starter/generator, utilize a rotor assembly. One type of rotor assembly includes spaced apart wire supports mounted on a shaft. Each wire support includes end turns about which one or more wires are wrapped to provide a coil supported on the rotor assembly. Typically, a different wire support is used at each end of the rotor assembly. The wire support may also include cooling features to communicate cooling fluid to desired locations within the rotor assembly.

Wire supports have been machined from a solid block of TORLON. TORLON is a very expensive plastic material, and machining is a time consuming, costly manufacturing process.

SUMMARY

A rotor assembly for an electromechanical device includes a molded wire support. The wire support has a body including a first side spaced from a second side and a hole extending through the sides and configured to receive a shaft. The body includes a wall about the hole extending to the first side. At least one end turn support extends outwardly from the wall and is configured to support wires. A molded pocket extends into the wall from the second side without penetrating through to the first side.

BRIEF DESCRIPTION OF THE DRAWINGS

The disclosure can be further understood by reference to the following detailed description when considered in connection with the accompanying drawings wherein:

FIG. 5A is a cross-sectional view of the wire support taken along line 5A-5A in FIG. 4A.

FIG. 5B is a cross-sectional view of the wire support taken along line 5B-5B in FIG. 5A.

FIG. 5C is a cross-sectional view of the wire support taken along line 5C-5C in FIG. 5A.

FIG. 5D is a bottom elevational view of the wire support shown in FIG. 5A.

FIG. 5E is an enlarged view taken from FIG. 5D.

FIG. 6A is a cross-sectional view of another example wire support similar to the wire support illustrated in FIG. 4A.

FIG. 6B is a cross-sectional view of the wire support taken along line 6B-6B in FIG. 6A.

FIG. 6C is a cross-sectional view of the wire support taken along line 6C-6C in FIG. 6A.

FIG. 6D is a bottom elevational view of the wire support shown in FIG. 6A.

FIG. 7 is a schematic view of an injection molding process used in manufacturing the example wire supports.

DETAILED DESCRIPTION

Figure 1:
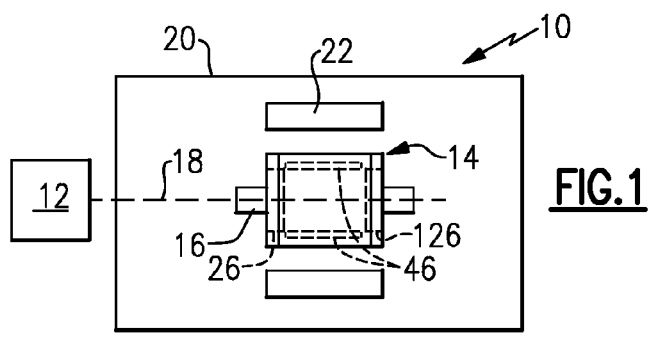
FIG. 1 is a schematic view of an electromechanical device.
Figure 2:
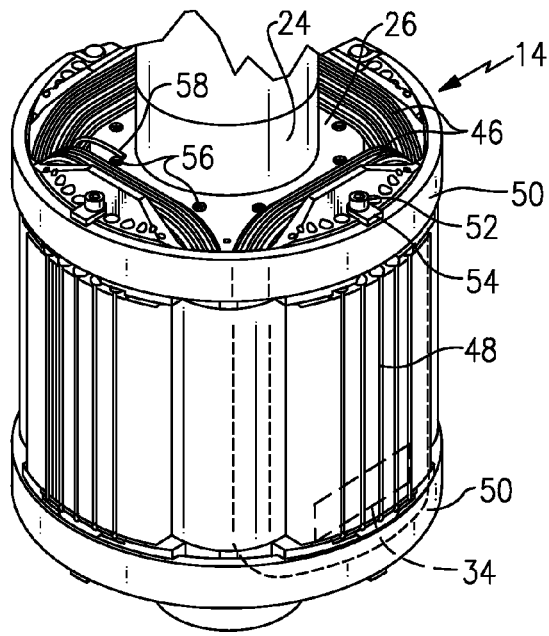
FIG. 2 is a perspective view of a rotor assembly.
Figure 3:
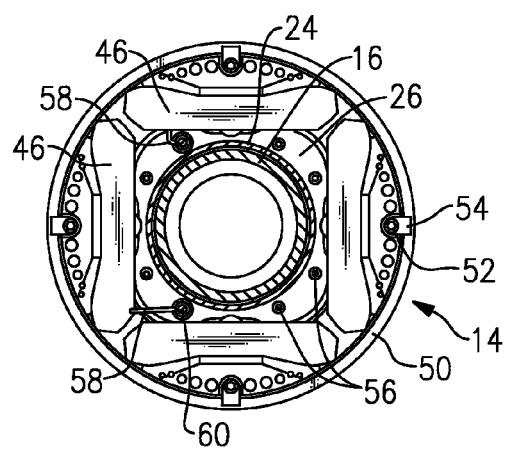
FIG. 3 is a top elevational view of the rotor assembly shown in FIG. 2.
Figure 4A:
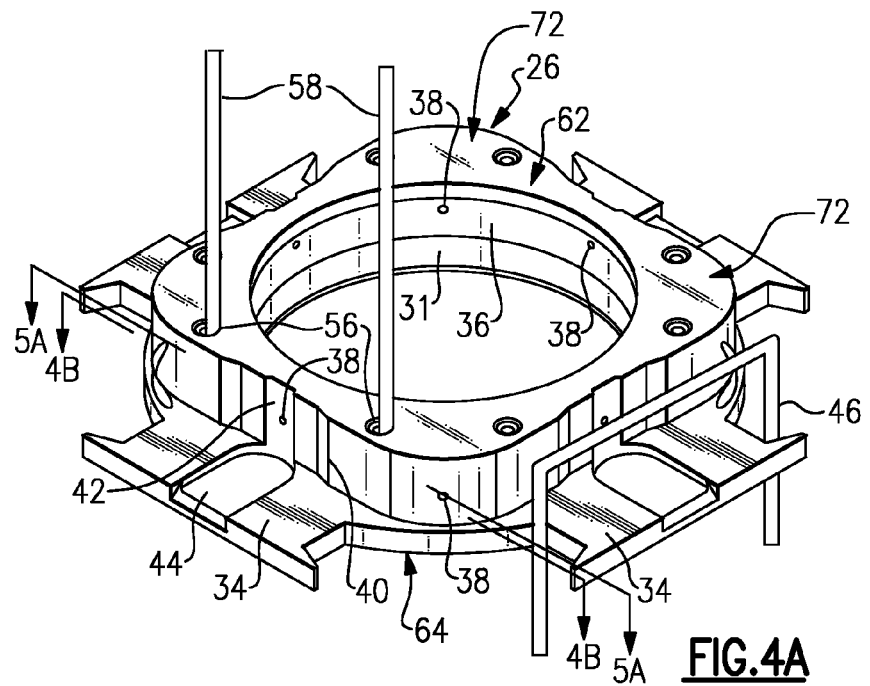
FIG. 4A is a top perspective view of one wire support for the rotor assembly having a wire winding schematically depicted.
Figure 4B:
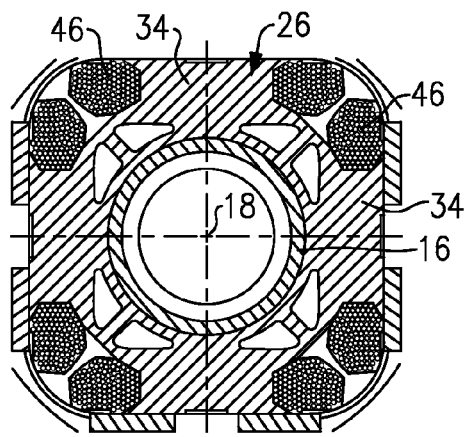
FIG. 4B is a cross-sectional view of the wire support taken along line 4B-4B in FIG. 4A.
Figure 4C:
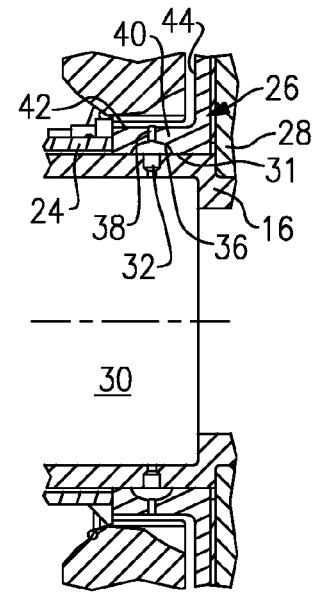
FIG. 4C is a cross-sectional view of the wire support shown in FIG. 4A illustrated on a shaft of the rotor assembly.

An electromechanical (EM) device 10, such as a starter/generator, is schematically illustrated in FIG. 1. The EM device 10 is rotationally coupled to a primary mover 12, such as an aircraft engine, to receive and/or impart rotation from and to the primary mover 12.

The EM device 10 includes a rotor assembly 14 having a shaft 16 rotatable about an axis 18. A stator 22 is arranged within a housing 20 about the rotor assembly 14. Wire supports 26, 126 are provided on the rotor assembly 14 for supporting wire windings 46 (FIGS. 1-4B). The wire windings 46 impart a current in the stator 22 and/or receive rotational input from current in the stator 22, depending upon the application. The stator 22 may be a wire coil or permanent magnet.

Referring to FIGS. 2-4C, the wire supports 26, 126 are arranged on opposing portions of the shaft 16. In the example, a spacer 28 is provided on the shaft 16 to maintain the wire supports 26, 126 in a desired axial spacing. Each wire support 26, 126 includes four end turn supports 34 circumferentially spaced from one another about the wire support body and circumferentially aligned with the opposing end turn supports 34. It should be understood, however, that the end turn supports may be configured in a manner other than disclosed and still fall within the claims.

Wire winding 46 are wrapped around the end turns 34 (shown by dashed lines in FIGS. 1 and 2) to provide a wire coil. In one example, a sleeve 24 is provided on the shaft 16 adjacent to each of the wire supports 26, 126. The wire supports 26, 126 also act as cooling manifolds. The shaft 16 includes a cavity 30 that carries a cooling fluid, such as oil. One or more supply holes 32 in the shaft 16 communicate cooling fluid to an annulus 36 recessed from a central hole 31 in the body, which extends through the body from a first side 62 to a second side 64. A wall 40 extends axially away from the second side 64 to provide the first side 62. A depression 42 in the wall 40 adjoins a recess 44 in each end turn 34, for example. An orifice 38 extends from the annulus 36 to the depression 42 for communicating cooling fluid from the cavity 30 to the end turn supports 34 where the cooling fluid can extract heat from the coil.

The rotor assembly 14 includes laminations 48 extending between spaced apart containment bands 50 surrounding the wire supports 26, 126. Fasteners 52 and tabs 54 thread into the laminations 48 to trap the wire bundles 46 on the wire support 26 in a desired position relative to the shaft 16.

The wire support body provides lobes 72 arranged between the end turn supports 34. Thus, in the example, the body provides four lobes with each lobe 72 arranged between an adjoining pair of end turn supports 34. The wire support 26 (FIGS. 4A-5E) is configured to support wire ends 58. In the example, each lobe 72 includes a pair of threaded holes 56 that is adapted to receive a fastener 60 used to secure a wire end 58 to the wire support 26, as shown in FIGS. 2-4A and best shown in FIG. 3. Multiple holes 56 enable the wire ends 58 to be secured at different locations depending on the method of winding the coil about the end turn supports 34. The other wire support 126 does not support any free wire ends in the example. As a result, the example rotor assembly 14 uses two different wire supports 26, 126 having different dimensions at various locations, which is discussed in more detail subsequently.

The wire support 26 is shown in more detail in FIGS. 5A-5E. The wire support 26 includes molded cavities that prevent undesired cracking, wrapage or shrinkage during molding to facilitate molding the wire support 26 from a plastic material, such as TORLON. In the example, first and second pockets 76, 78 are provided in the lobes 72 and extend from the second side 64 into the body, but not all the way through to the first side 62 in the example. The wall 40 is bounded by an outer perimeter 70 and the hole 31. An intermediate wall 74 separates the first and second pockets 76, 78. The intermediate wall 74 has a thickness of approximately 0.200 to 0.240 inch (5.080 to 6.096 mm) in one example, and in one example 0.150 inch (3.810 mm). An example radial thickness of the outer wall 68 is approximately 0.185 to 0.200 inch (4.699 to 5.080 mm). In the example, an orifice 38 is provided at the intermediate wall 74. Inner and outer walls 66, 68 adjoin the intermediate wall 74 and define the shape of the first and second pockets 76, 78, which are symmetrical in the example. An example radial thickness of the inner wall is approximately 0.125 to 0.170 inch (3.175 to 4.318 mm).

In the example, each of the first and second pockets 76, 78 include a base portion 80 and an inner portion 82 that is smaller than the base portion 80, resulting in a shoulder 92. The axial thickness of the shoulder 92 to the bottom of the annulus 36 is 0.080 to 0.165 inch (2.032 to 4.191 mm) in one example. The shoulder 92 includes radii 91 where it meets the inner, outer and intermediate walls 66, 68, 74. The radii 91 within the first and second pockets 76, 78 are around 0.030 to 0.090 inch (0.762 to 2.286 mm), for example. The inner portion 82 is further recessed into the body from the second side 64 than the base portion 80 and extends axially in the direction of the holes 56. As best seen in FIG. 5E, the base and inner portions 80, 82 share a common intermediate surface 94 that extends in a generally axial direction. As appreciated from the sections, the holes 56 overlap the base portions 80 but do not extend through to the base portions 80, for example.

In the example, the base portion 80 has a generally triangular cross-section and includes first, second and third radii 84, 86, 88 at the vertices. In one example, the first radius 84 is approximately 0.060 to 0.090 inch (1.524 to 2.286 mm) (as indicated in FIG. 5E). The second radius 86 is approximately 0.060 to 0.090 inch (1.524 to 2.286 mm), and the third radius 88 is approximately 0.060 to 0.090 inch (1.524 to 2.286 mm), for example. The inner portion 82 is generally quadrangular in shape and includes a fourth radius 90 at its corners that is approximately 0.035 to 0.060 inch (0.889 to 1.524 mm), for example.

The wire support 126 is shown in more detail in FIGS. 6A-6D. Like numerals are used to indicate like features within the Figures. The wire support 126 is similar to the wire support 26. The wire support 126 has a smaller hole 131, resulting in a larger annulus 136. In another example of differences, the wire support 126 does not include the wire end attachment features. Thus, the molded cavities in the wire support 126 may be of a different shape and size.

In the example, first and second pockets 176, 178 are provided in the lobes 172 and extend from the second side 164 into the body, but not all the way through to the first side 162 in the example. The wall 140 is bounded by an outer perimeter 170 and the hole 131. An intermediate wall 174 separates the first and second pockets 176, 178. The intermediate wall 174 has a thickness of approximately 0.200 to 0.240 inch (5.080 to 6.096 mm) in one example. In the example, an orifice 138 is provided at the intermediate wall 174 and communicates cooling fluid to the depression 142 and recess 144 at the perimeter 170. Inner and outer walls 166, 168 adjoin the intermediate wall 174 and define the shape of the first and second pockets 176, 178, which are symmetrical in the example. An example radial thickness of the inner wall is approximately 0.125 to 0.170 inch (3.175 to 4.318 mm).

In the example, each of the first and second pockets 176, 178 include a base portion 180 and an inner portion 182 that is smaller than the base portion 180, resulting in a shoulder 192. The axial thickness of the shoulder 192 to the bottom of the annulus 136 is at least 0.124 inch (3.15 mm) in one example. The shoulder 192 includes radii 191 where it meets the inner, outer and intermediate walls 166, 168, 174. The 191 radii within the first and second pockets 176, 178 are around 0.030 to 0.090 inch (0.762 to 2.286 mm), for example. The inner portion 182 is further recessed into the body from the second side 164 than the base portion 180 and extends axially in the direction of side 126. As best seen in FIG. 6D, the base and inner portions 180, 182 share a common intermediate surface 194 that extends in a generally axial direction.

In the example, the base portion 180 has a generally quadrangular cross-section include first, second, third and fourth radii 184, 186, 188, 189 at the corners. In one example, the first radius 184 is approximately 0.060 to 0.090 inch (1.524 to 2.286 mm) (as indicated in FIG. 6D). The second radius 186 is approximately 0.060 to 0.090 inch (1.524 to 2.286 mm), and the third radius 188 is approximately 0.060 to 0.090 inch (1.524 to 2.286 mm), for example. The fourth radius 189 is approximately 0.060 to 0.090 inch (1.524 to 2.286 mm). The inner portion 182 is generally triangular in shape and includes fifth and sixth radii 190, 196 at its corners that are respectively approximately 0.035 to 0.060 inch (0.889 to 1.524 mm), for example.

A molding process 100 is schematically shown in FIG. 7. In one example, the molding process 100 includes an injector 108 that injects a melt-flowable plastic into a mold cavity 106 provided by first and second molds 102, 104. More or fewer molds may be used. The cavity 106 includes features that are of a complementary shape to the pockets formed in the wire supports. Features such as the annulus, orifices and holes also may be molded or may be later machined, as desired.

Although an example embodiment has been disclosed, a worker of ordinary skill in this art would recognize that certain modifications would come within the scope of the claims. For that reason, the following claims should be studied to determine their true scope and content.

What is claimed is:

1. A wire support for a rotor assembly comprising:
   a body including a first side spaced from a second side and a hole extending through the sides and configured to receive a shaft, the body including a wall about the hole extending to the first side, at least one end turn support extending outwardly from the wall and configured to support wires, and a pocket extending into the wall from the second side without penetrating through to the first side; and
   wherein the wall provides at least one lobe between adjoining end turn supports, the pocket extending into the lobe.

2. A wire support for a rotor assembly comprising:
   a body including a first side spaced from a second side and a hole extending through the sides and configured to receive a shaft, the body including a wall about the hole extending to the first side, at least one end turn support extending outwardly from the wall and configured to support wires, and a pocket extending into the wall from the second side without penetrating through to the first side;

wherein the wall provides at least one lobe between adjoining end turn supports, the pocket extending into the lobe; and a first and second pocket in the lobe separated by an intermediate wall extending radially between inner and outer walls to provide the first and second pockets.

3. The wire support according to claim 2, wherein an outer perimeter and the hole bound the wall, and an orifice extends through the intermediate wall from the outer perimeter to the hole.

4. The wire support according to claim 3, wherein the hole includes an annulus to which the orifice extends.

5. The wire support according to claim 2, wherein the inner wall includes a thickness of approximately 0.150 inch.

6. The wire support according to claim 2, wherein the outer wall includes a thickness of approximately 0.200 inch.

7. The wire support according to claim 2, wherein the intermediate wall includes a thickness of approximately 0.200 inch.

8. A wire support for a rotor assembly comprising:
a body including a first side spaced from a second side and a hole extending through the sides and configured to receive a shaft, the body including a wall about the hole extending to the first side, at least one end turn support extending outwardly from the wall and configured to support wires, and a pocket extending into the wall from the second side without penetrating through to the first side; and wherein the pocket includes a base portion and an inner portion further recessed into the body from the second side than the base portion, wherein the inner portion includes a smaller cross-section than the base portion.

9. The wire support according to claim 8, wherein a hole extends axially from the first side in overlapping relation with the base portion, the inner portion extending in the axial direction near the hole.

10. The wire support according to claim 8, wherein first and second pockets are arranged symmetrically relative to one another in the lobe.

11. The wire support according to claim 8, wherein the base portion is generally quadrangular in shape and the inner portion is generally triangular in shape.

12. The wire support according to claim 8, wherein the base portion is generally triangular in shape and the inner portion is generally quadrangular in shape.

13. A wire support for a rotor assembly comprising:
a body including a first side spaced from a second side and a hole extending through the sides and configured to receive a shaft, the body including a wall about the hole extending to the first side, at least one end turn support extending outwardly from the wall and configured to support wires, and a pocket extending into the wall from the second side without penetrating through to the first side; and wherein the pocket includes radii approximate 0.035-0.090 inch.

14. A rotor assembly comprising:
a shaft having opposing ends;
first and second wire supports mounted on the end opposite one another, the first and second wire supports each providing multiple end turn supports, the first and second wire supports each having a body including a first side spaced from a second side and a hole extending through the sides and receiving the shaft, each body including a wall about the hole extending to the first side, at least one end turn extending outwardly from the wall and configured to support wires, and a pocket extending into the wall from the second side without penetrating through to the first side;
wire windings wrapped around the end turn supports of the first and second wire supports and including a wire end secured to a first side of the first wire support; and
wherein the pocket includes a base portion and an inner portion further recessed into the body from the second side than the base portion, wherein the inner portion includes a smaller cross-section than the base portion.

15. A method of assembling a rotor assembly comprising:
providing a first body including a first side spaced from a second side, a wall extending to the first side, at least one end turn support extending outwardly from the wall, and a molded pocket extending into the wall from the second side;
mounting the first body onto a shaft;
wrapping a wire about the end turn support to produce a rotor assembly; and
wherein the pocket includes a base portion and an inner portion further recessed into the body from the second side than the base portion, wherein the inner portion includes a smaller cross-section than the base portion.

16. The method according to claim 15, comprising the step of mounting a second body onto the shaft, the second body including a second end turn support, the wrapping step including wrapping the wire about the end turn supports of the first and second bodies.

17. The method according to claim 16, wherein the pocket extends into the wall without penetrating through to the first side.

18. The method according to claim 16, wherein the second body including a third side spaced from a fourth side, a second wall extending to the third side, and a second molded pocket extending into the second wall from the fourth side, the second body different than the first body.

19. The method according to claim 15, comprising the step of disposing the rotor assembly within a stator.

* * * * *